May 23, 1950     I. MEOHAS     2,509,105
FISH LURE

Filed Sept. 3, 1946

INVENTOR.
ISAAC MEOHAS
BY
ATTORNEY

Patented May 23, 1950

2,509,105

UNITED STATES PATENT OFFICE 2,509,105

FISH LURE

Isaac Meohas, Long Beach, Calif.

Application September 3, 1946, Serial No. 694,573

1 Claim. (Cl. 43—42.35)

This invention relates to fish lures, and an object is to provide a novel type of lure which includes a transparent casing adapted to carry either live bait or pieces of fish, meat or other foods which are visible to fish through the walls of the casing, and one or more hooks by means of which fish may be caught.

I prefer to arrange the casing of separable or openable members, whereby the casing may be opened in order to insert or remove bait, and with openings of sufficient area to allow water to enter the casing when the lure is submerged; also to provide suitable means for attaching a fishing line leader to the head and a hook to the body of the lure. Other objects will become apparent as the description of my lure progresses.

I have shown one embodiment of my invention in the accompanying drawing, subject to modification, within the scope of the appended claim, without departing from the spirit of the invention.

Figure 1:
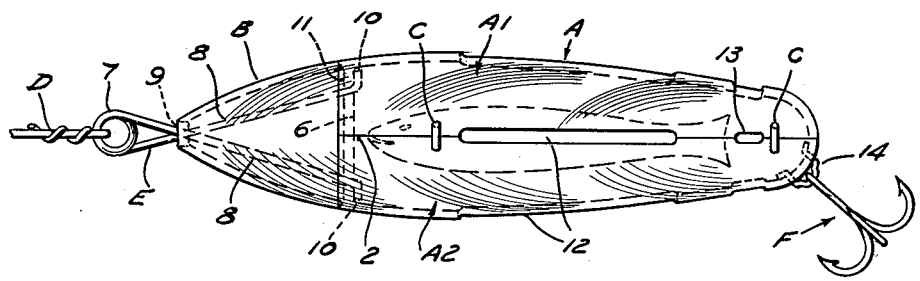
Fig. 1 is an external view of a fish lure embodying my improvements.

It may be understood that I may provide a lure within the limitations of this invention which may be of unitary or composite character, but I prefer to form the lure casing of at least two separable members of transparent material, so that when said members are opened, bait may be readily deposited in or removed from the casing at will. Hence, I will describe and have shown in the drawing a casing having separable parts.

Figure 3:
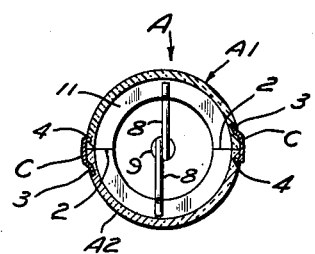
Fig. 3 is a transverse section on line 3—3 of Fig. 2.
Figure 5:
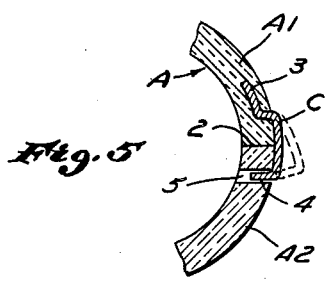
Fig. 5 is an enlarged fragmentary section of the body in the plane of Fig. 3.
Figure 6:
Fig. 6 is a view of an attaching clip adapted to hold adjacent parts of the lure body detachably connected.

As shown, I may provide a lure casing formed of a unitary elongated body member generally indicated at A and a separable head or cap B. However, body A may be formed of hinged or separable members A1 and A2 of semicylindrical cross section with their mating edges engageable on a diametrical parting line 2. Said members may be hinged together on one side of the body or held together by one or more spring clips C, as shown in Figs. 3, 5 and 6. Said clips may have portions 3 imbedded in or attached to member A1 or A2 and yieldable portions 4 detachably engaging perforations 5 in the adjacent member as shown in Fig. 5.

In any case, I prefer to provide the body A with the detachable head or cap B for closing a forwardly formed opening 6 in the body and adapted to form a support E for a leader D, by means of which, the lure may be attached to a fishing line. The head B is supported by tensioned wire attaching member E, formed with an outer eye 7 to which the leader is attached, and crossed legs 8, 8 inserted through a front end opening 9 of the head. Legs 8, 8 have bent terminal portions 10, 10 adapted to snap under an internal flange 11 of body A or lugs in lieu of said flange. Member E projects sufficiently forwardly of head B to permit contraction of legs 8, 8 in releasing them from the flange 11 thereby permitting detachment of the head from the body and its attachment thereto at will.

Body A may have longitudinal slits 12 and apertures 13 in its walls for permitting free ingress to and egress of water from the interior thereof, in order that live bait may be kept alive and other bait kept fresh.

Figure 2:
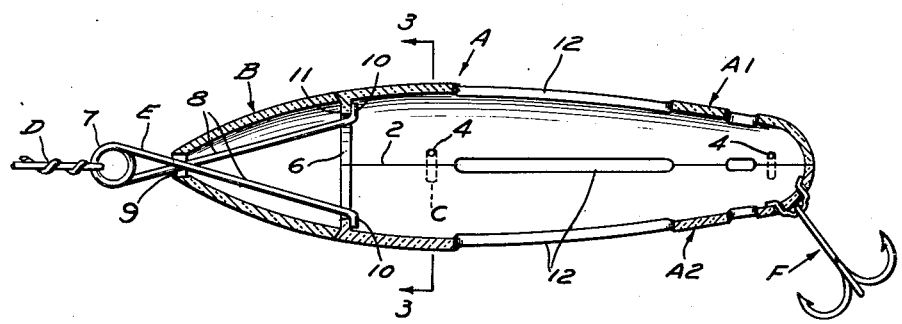
Fig. 2 is a longitudinal section of the same.
Figure 4:
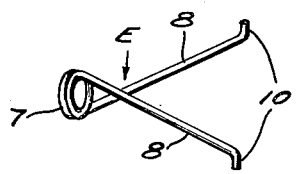
Fig. 4 is a perspective view of a head attaching member.

One or more hooks F may be attached to body A as shown in Figs. 1 and 2, or otherwise, as by means of attaching members 14 or other devices not material to this invention.

I claim:

A fish lure having a hollow apertured body of transparent material provided with an internal flange and hooks attached to said body including: a detachable head portion, and a resilient clip extending through the head portion and formed with an eye forwardly of the head portion for attachment to a fishing line and with parts extending from within said head portion and adapted to securely engage the body portion during use of the lure, but operable to permit removal of the head portion for the deposit of live bait in or its removal from the lure; said head portion having a central aperture at its leading end, said clip being formed of tensioned wire having a loop forming said eye and legs extending rearwardly from said loop through said central aperture into said body and bent at their trailing ends for engagement with the flange of said body portion so as to detachably secure the head portion to the body portion, the legs of said clip being sufficiently extended from the head portion that they may be manipulated to release the body portion.

ISAAC MEOHAS.

REFERENCES CITED

The following references are of record in the file of this patent:

UNITED STATES PATENTS

| Number | Name | Date |
|---|---|---|
| 556,494 | Dales | Mar. 17, 1896 |
| 1,089,074 | Pfeiffer | Mar. 3, 1914 |
| 2,112,385 | Smith | Mar. 29, 1938 |
| 2,216,688 | Harvey | Oct. 1, 1940 |
| 2,302,206 | Gibson et al. | Nov. 17, 1942 |